(12) United States Patent
Oikawa

(10) Patent No.: US 6,901,179 B2
(45) Date of Patent: May 31, 2005

(54) OPTICAL SWITCH AND USING METHOD THEREFOR

(75) Inventor: Yoichi Oikawa, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/817,854

(22) Filed: Apr. 6, 2004

(65) Prior Publication Data

US 2004/0190816 A1 Sep. 30, 2004

Related U.S. Application Data

(62) Division of application No. 10/340,618, filed on Jan. 13, 2003, now Pat. No. 6,748,130.

(30) Foreign Application Priority Data

Aug. 20, 2002 (JP) ........................................ 2002-238804

(51) Int. Cl.[7] .................................................. G02B 6/26
(52) U.S. Cl. ........................................... 385/17; 385/18
(58) Field of Search ..................................... 385/16–18

(56) References Cited

U.S. PATENT DOCUMENTS

| 5,982,554 | A  |   | 11/1999 | Goldstein et al. |           |
|-----------|----|---|---------|------------------|-----------|
| 6,160,928 | A  |   | 12/2000 | Schroeder        |           |
| 6,198,856 | B1 |   | 3/2001  | Schroeder et al. |           |
| 6,285,022 | B1 | * | 9/2001  | Bhalla           | 250/227.22|
| 6,453,083 | B1 |   | 9/2002  | Husain et al.    |           |
| 6,493,479 | B1 |   | 12/2002 | Briggs           |           |
| 6,610,974 | B1 | * | 8/2003  | Hunt et al.      | 250/227.22|
| 6,731,833 | B2 | * | 5/2004  | Sandler et al.   | 385/17    |
| 6,754,409 | B2 | * | 6/2004  | Laor et al.      | 385/16    |

* cited by examiner

*Primary Examiner*—Ellen E. Kim
(74) *Attorney, Agent, or Firm*—Staas & Halsey LLP

(57) ABSTRACT

Disclosed herein is an optical switch including a plurality of switch cells arranged in the form of an n×n matrix (n is an integer), each switch cell having first and second input ends and first and second output ends, and 2(n−1) reflection cells. The plural switch cells are selectively driven so that one of the first and second input ends of the switch cells in the first column is optically connected to one of the first and second output ends of the switch cells in the n-th column. (n−1) ones of the 2(n−1) reflection cells are arranged so as to optically connect the first output end of the switch cell in the first row, the i-th column (i is an integer satisfying $1 \leq i \leq (n-1)$) to the first input end of the switch cell in the first row, the (i+1)-th column. The remaining (n−1) reflection cells are arranged so as to optically connect the second output end of the switch cell in the n-th row, the j-th column (j is an integer satisfying $1 \leq j \leq (n-1)$) to the second input end of the switch cell in the n-th row, the (j+1)-th column. This optical switch is suitable for size reduction and can eliminate the path dependence of loss.

6 Claims, 18 Drawing Sheets

⊗ : REFLECTED IN ON STATE

FIG.7

| INPUT # \ OUTPUT # | 1 | 2 | 3 | 4 |
|---|---|---|---|---|
| 1 | SW 1, FX 1 ) 2 | SW 1, FX 0 ) 1 | SW 1, FX 1 ) 2 | SW 1, FX 0 ) 1 |
| 2 | SW 1, FX 2 ) 3 | SW 1, FX 1 ) 2 | SW 1, FX 0 ) 1 | SW 1, FX 1 ) 2 |
| 3 | SW 1, FX 1 ) 2 | SW 1, FX 0 ) 1 | SW 1, FX 1 ) 2 | SW 1, FX 2 ) 3 |
| 4 | SW 1, FX 0 ) 1 | SW 1, FX 1 ) 2 | SW 1, FX 0 ) 1 | SW 1, FX 1 ) 2 |

FIG.8

| OUTPUT # / INPUT # | 1 | 2 | 3 | 4 |
|---|---|---|---|---|
| 1 | SW 3, FX 1 ) 4 | SW 2, FX 0 ) 2 | SW 1, FX 1 ) 2 | SW 2, FX 0 ) 2 |
| 2 | SW 2, FX 2 ) 4 | SW 1, FX 1 ) 2 | SW 2, FX 0 ) 2 | SW 1, FX 1 ) 2 |
| 3 | SW 1, FX 1 ) 2 | SW 2, FX 0 ) 2 | SW 1, FX 1 ) 2 | SW 2, FX 2 ) 4 |
| 4 | SW 0, FX 0 ) 0 | SW 1, FX 1 ) 2 | SW 2, FX 0 ) 2 | SW 1, FX 1 ) 2 |

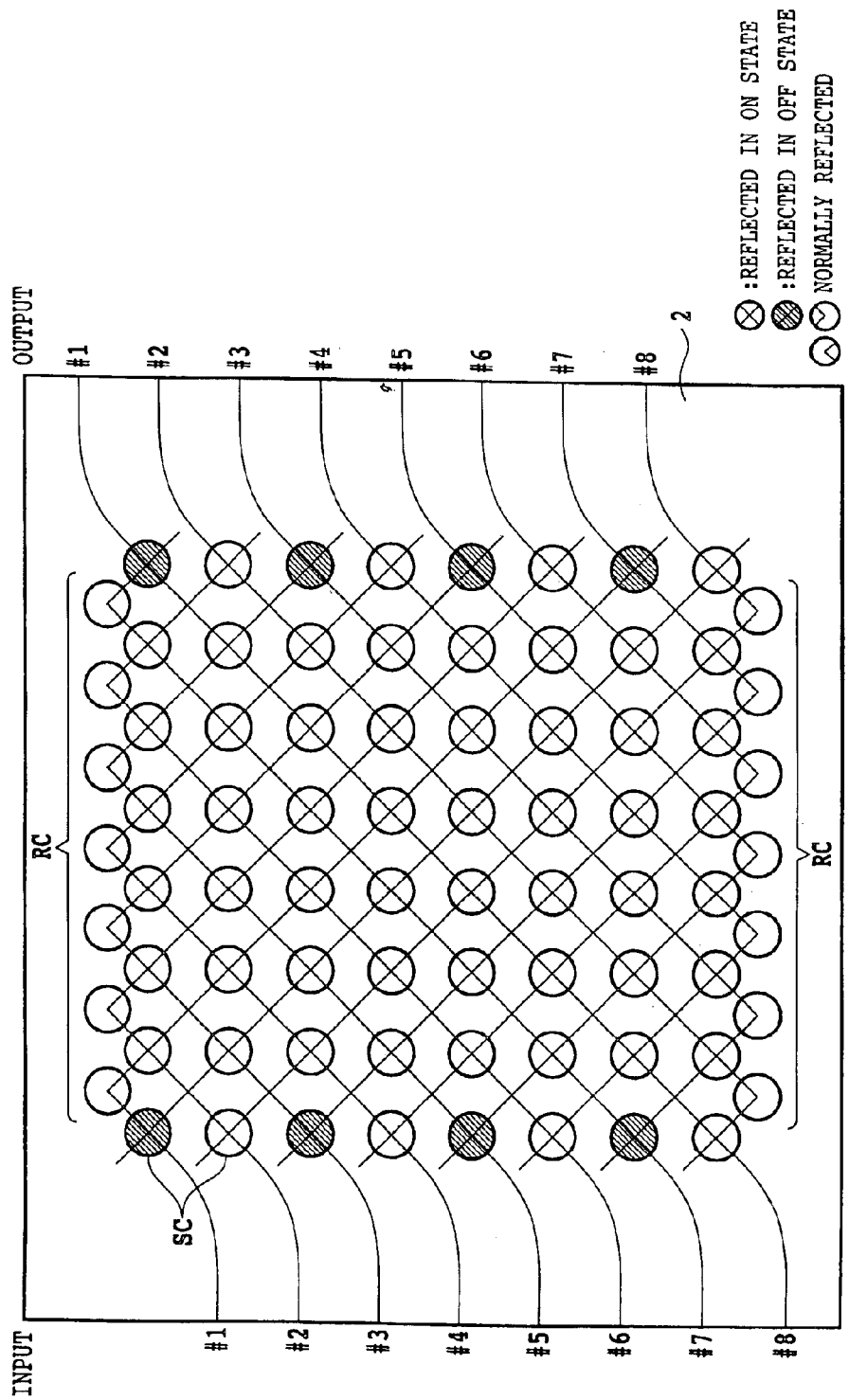

FIG.11

NUMBER OF REFLECTIONS : 1/2/3

| INPUT # \ OUTPUT # | 1 | 2 | 3 | 4 | 5 | 6 | 7 | 8 |
|---|---|---|---|---|---|---|---|---|
| 1 | $\binom{1}{1}$2 | $\binom{1}{0}$1 | $\binom{1}{1}$2 | $\binom{1}{0}$1 | $\binom{1}{1}$2 | $\binom{1}{0}$1 | $\binom{1}{1}$2 | $\binom{1}{0}$1 |
| 2 | $\binom{1}{2}$3 | $\binom{1}{1}$2 | $\binom{1}{2}$3 | $\binom{1}{1}$2 | $\binom{1}{2}$3 | $\binom{1}{1}$2 | $\binom{1}{0}$1 | $\binom{1}{1}$2 |
| 3 | $\binom{1}{1}$2 | $\binom{1}{0}$1 | $\binom{1}{1}$2 | $\binom{1}{0}$1 | $\binom{1}{1}$2 | $\binom{1}{0}$1 | $\binom{1}{1}$2 | $\binom{1}{2}$3 |
| 4 | $\binom{1}{2}$3 | $\binom{1}{1}$2 | $\binom{1}{2}$3 | $\binom{1}{1}$2 | $\binom{1}{0}$1 | $\binom{1}{1}$2 | $\binom{1}{0}$1 | $\binom{1}{1}$2 |
| 5 | $\binom{1}{1}$2 | $\binom{1}{0}$1 | $\binom{1}{1}$2 | $\binom{1}{0}$1 | $\binom{1}{1}$2 | $\binom{1}{2}$3 | $\binom{1}{1}$2 | $\binom{1}{2}$3 |
| 6 | $\binom{1}{2}$3 | $\binom{1}{1}$2 | $\binom{1}{0}$1 | $\binom{1}{1}$2 | $\binom{1}{0}$1 | $\binom{1}{1}$2 | $\binom{1}{0}$1 | $\binom{1}{1}$2 |
| 7 | $\binom{1}{1}$2 | $\binom{1}{0}$1 | $\binom{1}{1}$2 | $\binom{1}{2}$3 | $\binom{1}{1}$2 | $\binom{1}{2}$3 | $\binom{1}{1}$2 | $\binom{1}{2}$3 |
| 8 | $\binom{1}{0}$1 | $\binom{1}{1}$2 | $\binom{1}{0}$1 | $\binom{1}{1}$2 | $\binom{1}{0}$1 | $\binom{1}{1}$2 | $\binom{1}{0}$1 | $\binom{1}{1}$2 |

(UPPER : SW CELL REFLECTION
LOWER : FIXED MIRROR REFLECTION)

FIG.12

NUMBER OF REFLECTIONS : 0/2/4

| OUTPUT # \ INPUT # | 1 | 2 | 3 | 4 | 5 | 6 | 7 | 8 |
|---|---|---|---|---|---|---|---|---|
| 1 | (3/1)4 | (2/0)2 | (3/1)4 | (2/0)2 | (3/1)4 | (2/0)2 | (1/1)2 | (2/0)2 |
| 2 | (2/2)4 | (1/1)2 | (2/2)4 | (1/1)2 | (2/2)4 | (1/1)2 | (2/0)2 | (1/1)2 |
| 3 | (3/1)4 | (2/0)2 | (3/1)4 | (2/0)2 | (1/1)2 | (2/0)2 | (1/1)2 | (2/2)4 |
| 4 | (2/2)4 | (1/1)2 | (2/2)4 | (1/1)2 | (2/0)2 | (1/1)2 | (2/0)1 | (1/1)2 |
| 5 | (3/1)4 | (1/1)2 | (1/1)2 | (1/1)2 | (1/1)2 | (2/2)4 | (3/1)4 | (2/2)2 |
| 6 | (2/2)4 | (1/1)2 | (2/0)2 | (1/1)2 | (2/0)2 | (1/1)2 | (2/0)2 | (1/1)2 |
| 7 | (1/1)2 | (2/0)2 | (1/1)2 | (2/2)4 | (3/1)4 | (2/2)4 | (3/1)4 | (2/2)2 |
| 8 | (0/0)0 | (1/1)2 | (2/0)2 | (1/1)2 | (2/0)2 | (1/1)2 | (2/0)2 | (1/1)2 |

(UPPER : SW CELL REFLECTION
 LOWER : FIXED MIRROR REFLECTION)

OPTICAL SWITCH AND USING METHOD THEREFOR

This is a Divisional of application Ser. No. 10/340,618, filed Jan. 13, 2003, now U.S. Pat. No. 6,748,130.

BACKGROUND OF THE INVENTION

1. Field of the Invention

The present invention relates to an optical switch and a using method therefor, and more particularly to an optical switch suitable for a node in a photonic network using wavelength division multiplexing (WDM).

2. Description of the Related Art

The development and commercialization of a wavelength division multiplexing (WDM) system are proceeding as a communication system that can greatly increase a transmission capacity. To construct a large-scale photonic network by connecting WDM systems, there has been examined a ring type or mesh type network obtained by connecting nodes through optical fibers in the form of a loop or mesh.

In the ring type network, a transmission capacity in the loop increases with an increase in scale of the network. However, in each node, it is sufficient to perform processing using a relatively small-scale optical switch. To the contrary, in the mesh type network, a transmission capacity in each route is small, but it is necessary to perform processing using a large-scale optical switch in each node.

In a point-to-point link system, an electrical switch is conventionally used to extract lower-order signals in the node. By substituting an optical switch for the electrical switch, a cost in the node can be reduced.

Thus, the development of a large-scale optical switch is a key technology in constructing various types of networks.

A waveguide type optical switch is known as a conventional commercialized small-scale optical switch. The waveguide type optical switch includes a switch element and fiber arrays for inputs and outputs connected to the switch element.

For example, an optical switch referred to as a PILOSS type optical switch (Japanese Patent Laid-open No. 63-500140) has been developed to eliminate variations in loss according to the number of switch cells through which light is transmitted. This optical switch is configured by arranging $N^2$ switch cells each having two inputs and two outputs at the lattice positions of a matrix with N rows and N columns and suitably connecting the inputs and the outputs of the switch cells so as not to cause the path dependence of loss.

As an optical switch which can enlarge an integration scale with a low loss, there has recently been developed a bubble type optical switch configured by forming a bulk at each crossover of crossing type optical waveguides and generating a bubble in the bulk to thereby obtain a total reflection condition. In each switch cell, the transmission and total reflection of light are switched to thereby obtain a switch function with two inputs and two outputs.

On the other hand, a configuration of spatially switching light is considered as a traditional technique. By using a reflection mirror as an element for changing an optical path, the problems in performance of the waveguide type optical switch, such as on/off ratio and crosstalk can be almost eliminated. However, such a space switch is large in volume, and it is therefore difficult to increase the scale of the switch from the viewpoint of size.

To break through such circumstances, there has recently been developed a technique of reducing the size of this space switch by using a semiconductor technology. This technique is referred to as MEMS (Micro Electro Mechanical System), and it is also called optical MEMS in the case of application to the field of optics.

The optical switch using MEMS has a plurality of small mirrors formed on a substrate by a semiconductor fabrication technique, and performs switching of optical paths by selectively raising these mirrors by static electricity.

Information on MEMS may be provided by IEEE Photonic Technology Letters, Vol. 10, No. 4, April 1998, pp. 525–527.

To increase the scale of a waveguide type optical switch, the yield of each switch cell itself formed on the switch element must be increased. However, increasing the yield is relatively difficult because of narrow manufacturing tolerances. Accordingly, in increasing the scale of the waveguide type optical switch, it is necessary not only to improve the yield by improving the manufacturing method, but also to remarkably improve the performance of the switch element.

In the bubble type optical switch, switching is performed by using the principle of total reflection in each switch cell. Accordingly, the angle of crossing of the two optical waveguides connecting the two inputs and the two outputs in each switch cell is as large as about 90°, causing an increase in switch size. In other words, if the bend radius of curvature of an optical waveguide connecting the adjacent switch cells arranged on the outermost side is reduced, the loss in this optical waveguide is increased. Therefore, the bend radius of curvature of this optical waveguide must be set to a sufficient amount. In connection with this setting, the pitch of the switch cells is determined, resulting in an increase in switch size.

In the waveguide type or bubble type optical switch, there is a case that crossover portions of the waveguides are required on the input and output sides, causing an unignorable loss.

Further, in the MEMS type optical switch, there is a possibility that the number of reflections on the mirrors may be different according to path in some mode of operation. Accordingly, in the case that the reflection loss by the mirrors is unignorable, there arises a problem that a path-dependent loss is produced according to a difference in number of reflections on the mirrors.

SUMMARY OF THE INVENTION

It is therefore an object of the present invention to provide an optical switch which can be reduced in size.

It is another object of the present invention to provide an optical switch which can eliminate the path dependence of loss.

It is a further object of the present invention to provide an optical switch which can suppress losses by eliminating crossovers of the optical waveguides.

Other objects of the present invention will become apparent from the following description.

In accordance with an aspect of the present invention, there is provided an optical switch comprising a plurality of switch cells arranged in the form of an n×n matrix (n is an integer), each of the plurality of switch cells having first and second input ends and first and second output ends; and 2(n−1) reflection cells. The plurality of switch cells are selectively driven so that one of the first and second input ends of the switch cells in the first column is optically connected to one of the first and second output ends of the switch cells in the n-th column. (n−1) ones of the 2(n−1)

reflection cells are arranged so as to optically connect the first output end of the switch cell in the first row, the i-th column (i is an integer satisfying 1≦i≦(n−1)) to the first input end of the switch cell in the first row, the (i+1)-th column. The remaining (n−1) reflection cells are arranged so as to optically connect the second output end of the switch cell in the n-th row, the j-th column (j is an integer satisfying 1≦j≦(n−1)) to the second input end of the switch cell in the n-th row, the (j+1)-th column.

With this configuration, the plural reflection cells are provided at the specific positions with respect to the plural switch cells, so that it is possible to avoid a size enlargement due to an increase in bend radius of curvature as mentioned above and to thereby provide a compact optical switch.

In accordance with another aspect of the present invention, there is provided a using method for an optical switch having a plurality of switch cells arranged in the form of an n×n matrix (n is an integer), each of the plurality of switch cells having first and second input ends and first and second output ends; and 2(n−1) reflection cells. The plurality of switch cells are selectively driven so that one of the first and second input ends of the switch cells in the first column is optically connected to one of the first and second output ends of the switch cells in the n-th column. (n−1) ones of the 2(n−1) reflection cells are arranged so as to optically connect the first output end of the switch cell in the first row, the i-th column (i is an integer satisfying 1≦i≦(n−1)) to the first input end of the switch cell in the first row, the (i+1)-th column. The remaining (n−1) reflection cells are arranged so as to optically connect the second output end of the switch cell in the n-th row, the j-th column (j is an integer satisfying 1≦j≦(n−1)) to the second input end of the switch cell in the n-th row, the (j+1)-th column. In this method, only the switch cells relating to the switch cells in the odd-numbered rows, the first column and in the odd-numbered rows, the n-th column or only the switch cells relating to the switch cells in the even-numbered rows, the first column and in the even-numbered rows, the n-th column are used.

According to this method, the number of reflections in an optical path connecting an arbitrary one of the inputs and an arbitrary one of the outputs is always 2, and the optical path length of each optical path is constant irrespective of path, thereby eliminating the production of a path-dependent loss. Further, there are no crossovers at the inputs and the outputs, thereby eliminating an increase in excess loss.

In accordance with a further aspect of the present invention, there is provided an optical switch applicable to a first optical fiber transmission line unit and a second optical fiber transmission line unit. The optical switch comprises a plurality of switch cells arranged in the form of an n×n matrix (n is an integer), each of the plurality of switch cells having first and second input ends and first and second output ends; and 2(n−1) reflection cells. The plurality of switch cells are selectively driven so that one of the first and second input ends of the switch cells in the first column is optically connected to one of the first and second output ends of the switch cells in the n-th column. (n−1) ones of the 2(n−1) reflection cells are arranged so as to optically connect the first output end of the switch cell in the first row, the i-th column (i is an integer satisfying 1≦i≦(n−1)) to the first input end of the switch cell in the first row, the (i+1)-th column. The remaining (n−1) reflection cells are arranged so as to optically connect the second output end of the switch cell in the n-th row, the j-th column (j is an integer satisfying 1≦j≦(n−1)) to the second input end of the switch cell in the n-th row, the (j+1)-th column. The second output end of the switch cell in the first row, the i-th column is optical connected to the first input end of the switch cell in the second row, the (i+1)-th column. The first output end of the switch cell in the n-th row, the j-th column is optical connected to the second input end of the switch cell in the (n−1)-th row, the (j+1)-th column. The first output end of the switch cell in the k-th row (k is an integer satisfying 2≦k≦(n−1)), the i-th column is optically connected to the second input end of the switch cell in the (k−1)-th row, the (i+1)-th column. The second output end of the switch cell in the k-th row, the i-th column is optically connected to the first input end of the switch cell in the (k+1)-th row, the (i+1)-th column. The first input ends of the switch cells in the odd-numbered rows, the first column and the second output ends of the switch cells in the odd-numbered rows, the n-th column are inserted in the first optical fiber transmission line unit. The second input ends of the switch cells in the even-numbered rows, the first column and the first output ends of the switch cells in the even-numbered rows, the n-th column are inserted in the second optical fiber transmission line unit.

With this configuration, the method according to the present invention is applicable to bidirectional transmission to thereby obtain an effect that the switch cells can be efficiently used in addition to the above-mentioned effect by the method according to the present invention.

In accordance with a still further aspect of the present invention, there is provided an optical switch with N inputs and N outputs (N is an integer). This optical switch comprises a plurality of switch cells arranged at the lattice positions of a matrix with n rows (n=2N−1) and (n+1) columns; and two mirrors arranged perpendicularly to a plane defining the matrix and parallel to each other so as to interpose the plurality of switch cells. The number and positions of the plurality of switch cells are set so that input paths corresponding to the N inputs and output paths corresponding to the N outputs are parallel to each other and that the number of reflections in an optical path connecting each input path and each output path becomes 2.

With this configuration, by arranging $N^2$ switch cells at predetermined ones of the lattice positions of the matrix with n (n=2N−1) rows and (n+1) columns, the number of reflections in an optical path connecting an arbitrary one of the inputs and an arbitrary one of the outputs can be fixed to 2, thereby eliminating the path dependence of loss.

The above and other objects, features and advantages of the present invention and the manner of realizing-them will become more apparent, and the invention itself will best be understood from a study of the following description and appended claims with reference to the attached drawings showing some preferred embodiments of the invention.

BRIEF DESCRIPTION OF THE DRAWINGS

FIG. 7 is a table showing the number of reflections in the optical switch shown in FIG. 1;

FIG. 8 is a table showing the number of reflections in the optical switch shown in FIG. 6;

FIG. 10 is a plan view showing a fourth preferred embodiment of the optical switch according to the present invention;

FIG. 11 is a table showing the number of reflections in the optical switch shown in FIG. 9;

FIG. 12 is a table showing the number of reflections in the optical switch shown in FIG. 10;

DETAILED DESCRIPTION OF THE PREFERRED EMBODIMENTS

Some preferred embodiments of the present invention will now be described in detail with reference to the attached drawings.

Figure 1:
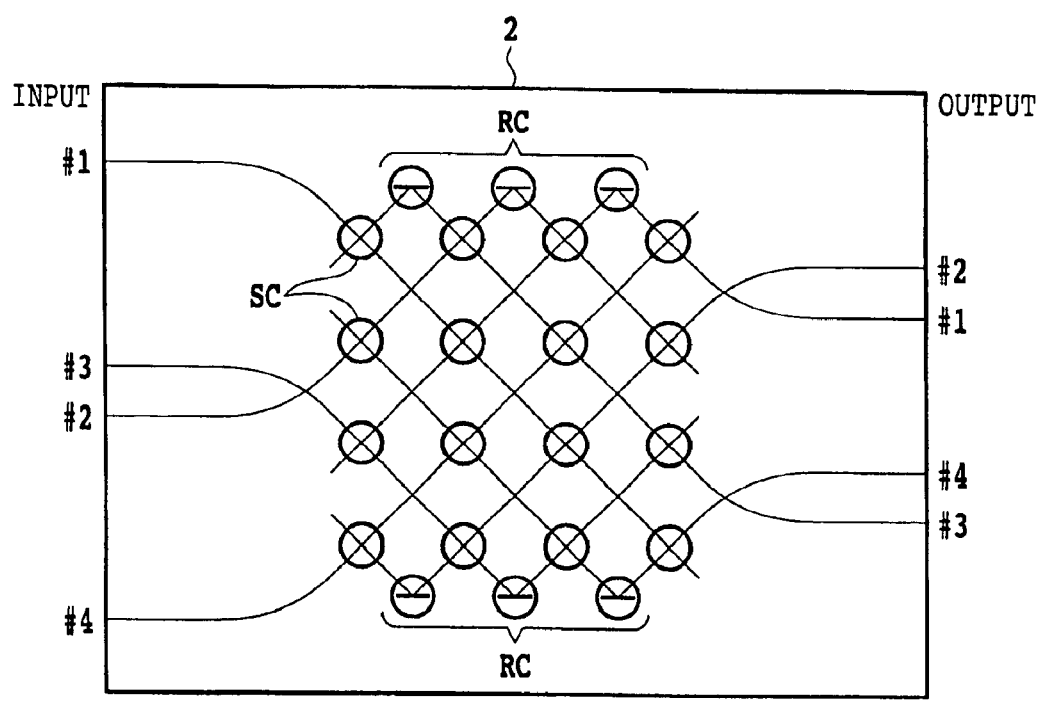
FIG. 1 is a plan view showing a first preferred embodiment of the optical switch according to the present invention.

FIG. 1 is a plan view showing a first preferred embodiment of the optical switch according to the present invention. This optical switch is configured by providing a plurality of switch cells SC and a plurality of reflection cells RC on a switch substrate 2 so as to establish a specific positional relation between these cells SC and RC. Prior to description of this positional relation, the configuration and operation of each switch cell SC will now be described.

Figure 2:
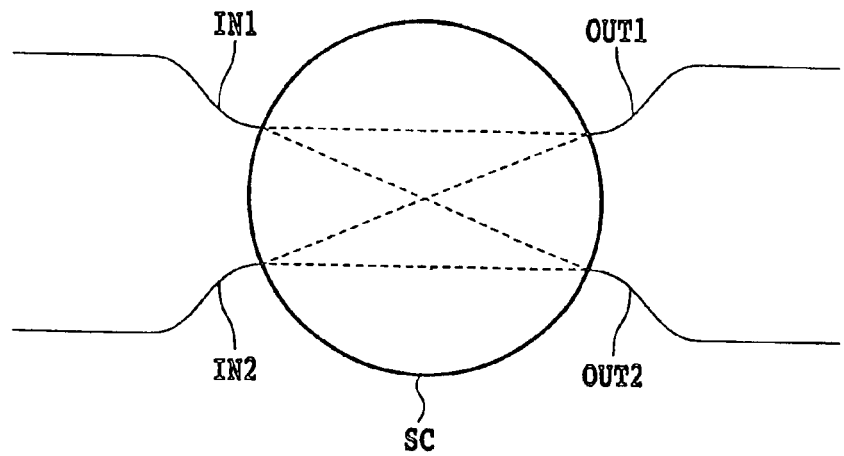
FIG. 2 is a diagram for illustrating the configuration and operation of a switch cell.

FIG. 2 is a diagram for illustrating the configuration and operation of each switch cell SC applicable to the present invention. The switch cell SC has two input ends IN1 and IN2 and two output ends OUT1 and OUT2, and it is electrically driven so as to switch between a bar state where the input end IN1 and the output end OUT1 are connected and the input end IN2 and the output end OUT2 are connected and a cross state where the input end IN1 and the output end OUT2 are connected and the input end IN2 and the output end OUT1 are connected.

As the switch cell SC, a conventional waveguide type switch cell may be used and a MEMS type switch cell and a bubble type switch cell to be hereinafter described in detail may also be used.

Figure 3:
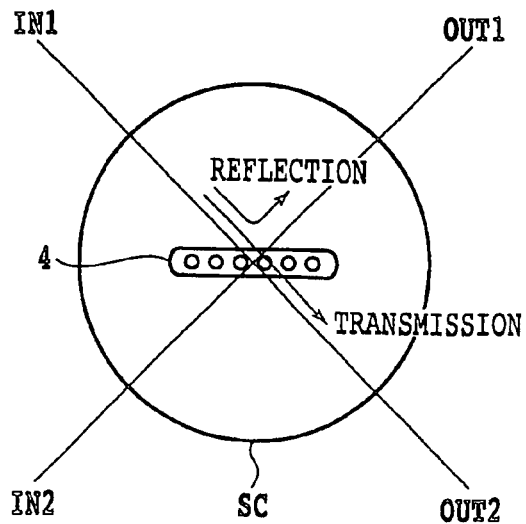
FIG. 3 is a diagram for illustrating the configuration of a bubble type switch cell.

FIG. 3 is a diagram for illustrating the configuration of a bubble type switch cell applicable to the present invention. A bulk 4 is formed on a substrate having optical waveguides for connecting input ends IN1 and IN2 and output ends OUT1 and OUT2. The bulk 4 is filled with a liquid, and the generation of a bubble in the liquid is switched on or off to thereby selectively obtain a reflective state and a transmissive state, which are made to respectively correspond to the bar state and the cross state. The angle of crossing of the two optical waveguides at a crossover point lying on the bulk 4 is almost 90° to obtain a total reflection condition.

Figure 4:
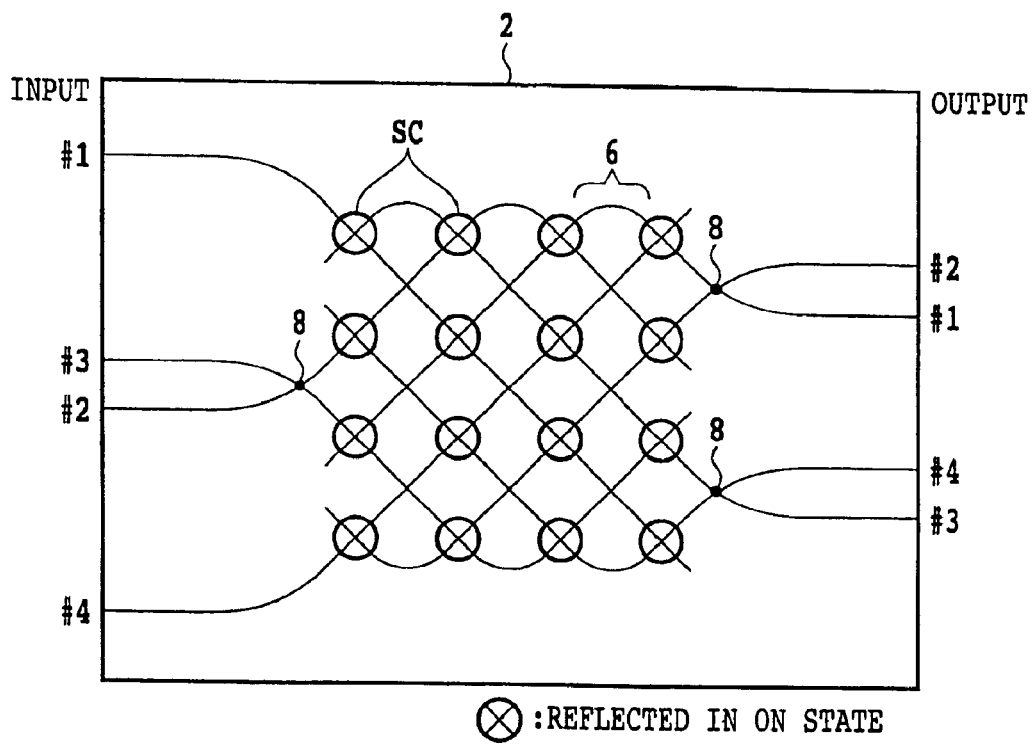
FIG. 4 is a plan view of a PILOSS type optical switch.

FIG. 4 is a plan view showing the configuration of a PILOSS type optical switch using the bubble type switch cells shown in FIG. 3. In this example, 16 switch cells SC are arranged at the lattice positions of a 4×4 (4 rows and 4 columns) matrix, so as to obtain an optical switch with four inputs and four outputs.

In this case, the distance between any two outermost adjacent switch cells SC is $\sqrt{2}R$ where R is the radius of curvature of a curved optical waveguide connecting these two switch cells SC, because the angle of crossing of the two optical waveguides at each switch cell SC is almost 90°. Accordingly, in considering the fact that the minimum bend radius of curvature of an optical waveguide with no waveguide loss is several millimeters, it is understood that size reduction of the optical switch is difficult.

Further, crossovers 8 of the optical waveguides are formed on the input side and on the output side, causing an unignorable loss.

In the preferred embodiment shown in FIG. 1, an optical switch with four inputs and four outputs is provided, wherein any arbitrary one of four input ports corresponding to four input channels #1 to #4 and any arbitrary one of four output ports corresponding to four output channels #1 to #4 are selectively connectable with each other. The input channels #1, #2, #3, and #4 are respectively assigned to the input end IN1 of the switch cell SC in the first row, the first column, the input end IN2 of the switch cell SC in the second row, the first column, the input end IN1 of the switch cell SC in the third row, the first column, and the input end IN2 of the switch cell SC in the fourth row, the first column. The output channels #1, #2, #3, and #4 are respectively assigned to the output end OUT2 of the switch cell SC in the first row, the fourth column, the output end OUT1 of the switch cell SC in the second row, the fourth column, the output end OUT2 of the switch cell SC in the third row, the fourth column, and the output end OUT1 of the switch cell SC in the fourth row, the fourth column.

Further, the input end IN2 of the switch cell SC in the first row, the first column, the input end IN1 of the switch cell SC in the second row, the first column, the input end IN2 of the switch cell SC in the third row, the first column, and the input end IN1 of the switch cell SC in the fourth row, the first column are unused ports. The output end OUT1 of the switch cell SC in the first row, the fourth column, the output end OUT2 of the switch cell SC in the second row, the fourth column, the output port OUT1 of the switch cell SC in the third row, the fourth column, and the output end OUT2 of the switch cell SC in the fourth row, the fourth column are also unused ports.

In this preferred embodiment, six reflection cells RC are used to avoid size enlargement due to the curvature of the curved optical waveguide mentioned above with reference to FIG. 4. Three ones of the six reflection cells RC are arranged so as to connect the output end OUT1 of the switch cell SC in the first row, the first column and the input end IN1 of the switch cell SC in the first row, the second column, to connect the output end OUT1 of the switch cell SC in the first row, the second column and the input end IN1 of the switch cell SC in the first row, the third column, and to connect the output end OUT1 of the switch cell SC in the first row, the third column and the input end IN1 of the switch cell SC in the first row, the fourth column. The remaining three reflection cells RC are arranged so as to connect the output end OUT2 of the switch cell SC in the fourth row, the first column and the input end IN2 of the switch cell SC in the fourth row, the second column, to connect the output end OUT2 of the switch cell SC in the fourth row, the second column and the input end IN2 of the switch cell SC in the fourth row, the third column, and to connect the output end OUT2 of the switch cell SC in the fourth row, the third column and the input end IN2 of the switch cell SC in the fourth row, the fourth column.

While the 4×4 optical switch has been described in this preferred embodiments the connection and arrangement of the switch cells and the reflection cells in the optical switch according to the present invention will now be described generally.

To provide an optical switch with n inputs and n outputs (n is an integer), $n^2$ switch cells SC arranged in the form of an n×n matrix and 2(n−1) reflection cells RC are used.

(n−1) ones of the 2(n−1) reflection cells RC are arranged so as to optically connect the output end OUT1 of the switch cell SC in the first row, the i-th column (i is an integer satisfying $1 \leq i \leq (n-1)$) to the input end IN1 of the switch cell SC in the first row, the (i+1)-th column.

The remaining (n−1) reflection cells RC are arranged so as to optically connect the output end OUT2 of the switch cell SC in the n-th row, the j-th column (j is an integer satisfying $1 \leq j \leq (n-1)$) to the input end IN2 of the switch cell SC in the n-th row, the (j+1)-th column.

The output end OUT2 of the switch cell SC in the first row, the i-th column is optically connected to the input end IN1 of the switch cell SC in the second row, the (i+1)-th column.

The output end OUT1 of the switch cell SC in the n-th row, the j-th column is optically connected to the input end IN2 of the switch cell SC in the (n−1)-th row, the (j+1)-th column.

The output end OUT1 of the switch cell SC in the k-th row (k is an integer satisfying $2 \leq k \leq (n-1)$), the i-th column is optically connected to the input end IN2 of the switch cell SC in the (k−1)-th row, the (i+1)-th column.

The output end OUT2 of the switch cell SC in the k-th row, the i-th column is optically connected to the input end IN1 of the switch cell SC in the (k+1)-th row, the (i+1)-th column.

The input ends IN1 of the switch cells SC in the odd-numbered rows, the first column and the input ends IN2 of the switch cells SC in the even-numbered rows, the first column correspond to input channels #1 to #n of this optical switch.

The output ends OUT2 of the switch cells SC in the odd-numbered rows, the n-th column and the output ends OUT1 of the switch cells SC in the even-numbered rows, the n-th column correspond to output channels #1 to #n of this optical switch.

This preferred embodiment is based on the assumption that the bar state and the cross state of each switch cell SC respectively correspond to the on state and the off state of a switch control signal. Drive conditions for each switch cell SC on this assumption will now be described.

Figure 5:
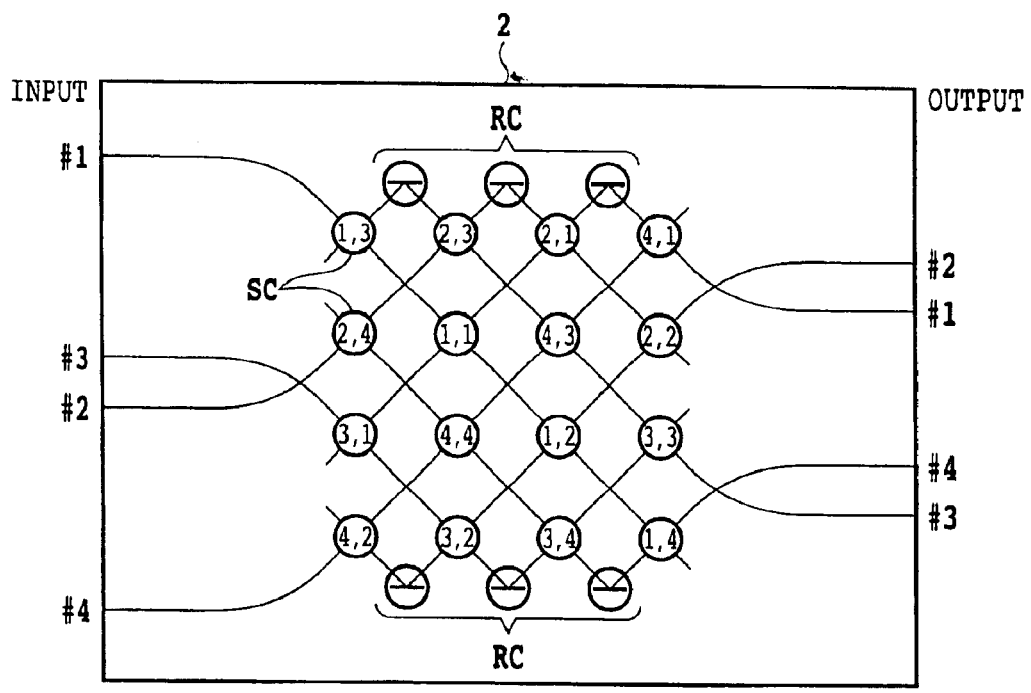
FIG. 5 is a plan view for illustrating the drive conditions for each switch cell in the first preferred embodiment.

FIG. 5 is a plan view for illustrating the drive conditions for each switch cell SC in the preferred embodiment shown in FIG. 1. The numeral (p, q) (p represents the numerals 1 to 4 and q represents the numerals 1 to 4) shown in the circle representing each switch cell SC indicates the switch cell SC switched on when establishing a path between the input channel #p and the output channel #q. For example, in the case of establishing a path between the input channel #1 and the output channel #1, the control signal for the switch cell SC in the second row, the second column is switched on to make a bar state. Accordingly, the input channel #1 and the output channel #1 are optically connected with each other by the reflection in this switch cell SC, the reflection in one reflection cell RC, and the transmission in three switch cells SC. It is apparent that this operation is nonblocking.

According to this preferred embodiment, the distance between any two adjacent ones of the switch cells SC can be reduced owing to the above-mentioned arrangement of the reflection cells RC, thereby providing a compact optical switch.

While each reflection cell RC may be provided by a configuration having fixed reflecting means unlike each switch cell SC, each reflection cell RC may be replaced by a switch cell SC for the purpose of simplification of an optical switch manufacturing process. In this case, each switch cell SC placed instead of each reflection cell RC is used always in the bar state, thereby allowing the same operation as that of this preferred embodiment.

Figure 6:
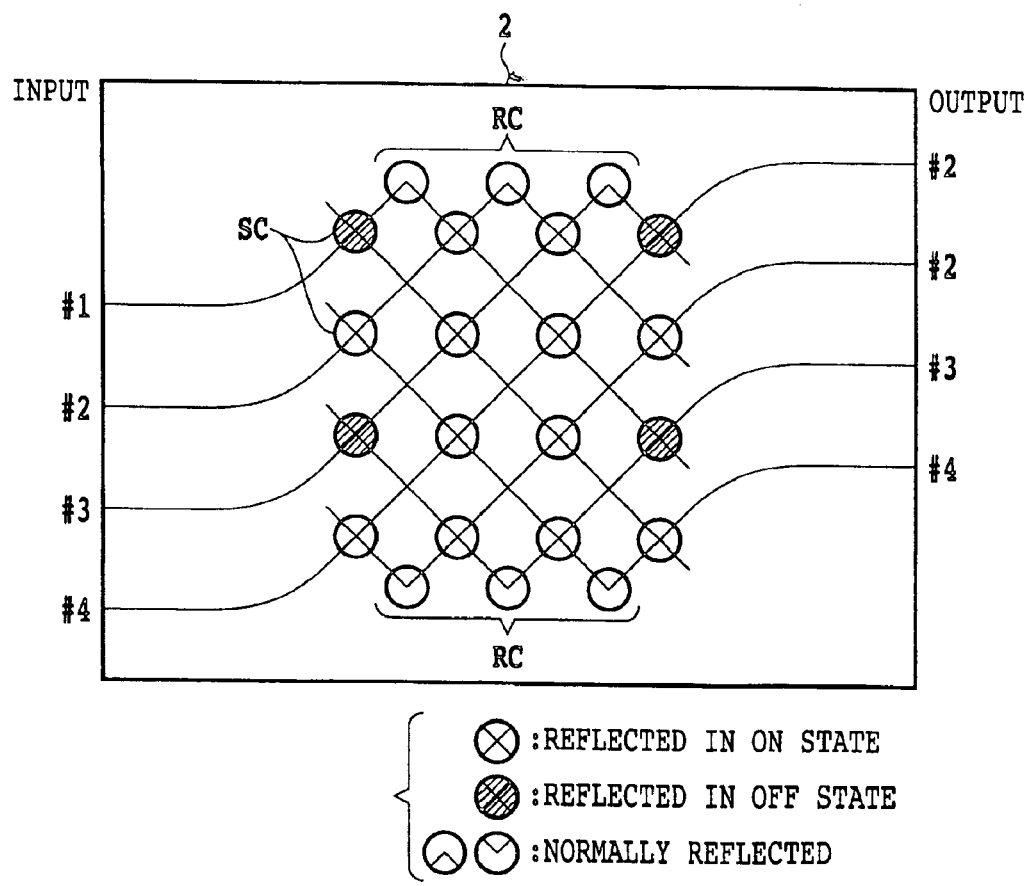
FIG. 6 is a plan view showing a second preferred embodiment of the optical switch according to the present invention.

FIG. 6 is a plan view showing a second preferred embodiment of the optical switch according to the present invention. In the first preferred embodiment shown in FIG. 1, there are crossovers of the optical waveguides between the input channels #2 and #3, between the output channels #1 and #2, and between the output channels #3 and #4, so that there is a possibility of increasing of excess loss. To eliminate this possibility, the second preferred embodiment is improved in setting of the input ports and the output ports and in drive control of the switch cells SC. The configuration of the second preferred embodiment will be generally described as an optical switch with n inputs and n outputs as in the above general description of the first preferred embodiment shown in FIG. 1.

Although overlapping the configuration of the first preferred embodiment shown in FIG. 1, a common part of the configuration of the second preferred embodiment will first be described.

To provide an optical switch with n inputs and n outputs (n is an integer), $n^2$ switch cells SC arranged in the form of an n×n matrix and 2(n−1) reflection cells RC are used.

(n−1) ones of the 2(n−1) reflection cells RC are arranged so as to optically connect the output end OUT1 of the switch cell SC in the first row, the i-th column (i is an integer satisfying $1 \leq i \leq (n-1)$) to the input end IN1 of the switch cell SC in the first row, the (i+1)-th column.

The remaining (n−1) reflection cells RC are arranged so as to optically connect the output end OUT2 of the switch cell SC in the n-th row, the j-th column (j is an integer satisfying $1 \leq j \leq (n-1)$) to the input end IN2 of the switch cell SC in the n-th row, the (j+1)-th column.

The output end OUT2 of the switch cell SC in the first row, the i-th column is optically connected to the input end IN1 of the switch cell SC in the second row, the (i+1)-th column.

The output end OUT1 of the switch cell SC in the n-th row, the j-th column is optically connected to the input end IN2 of the switch cell SC in the (n−1)-th row, the (j+1)-th column.

The output end OUT1 of the switch cell SC in the k-th row (k is an integer satisfying $2 \leq k \leq (n-1)$), the i-th column is optically connected to the input end IN2 of the switch cell SC in the (k−1)-th row, the (i+1)-th column.

The output end OUT2 of the switch cell SC in the k-th row, the i-th column is optically connected to the input end IN1 of the switch cell SC in the (k+1)-th row, the (i+1)-th column.

There will now be described a characterized part of the second preferred embodiment shown in FIG. 6 over the first preferred embodiment shown in FIG. 1.

The input ends IN2 of the switch cells SC in the odd-numbered rows, the first column and the input ends IN2 of the switch cells SC in the even-numbered rows, the first column correspond to input channels #1 to #n of this optical switch.

The output ends OUT1 of the switch cells SC in the odd-numbered rows, the n-th column and the output ends OUT1 of the switch cells SC in the even-numbered rows, the n-th column correspond to output channels #1 to #n of this optical switch.

In the first preferred embodiment shown in FIG. 1, the bar state and the cross state of all the switch cells SC correspond to the on state and the off state, respectively. In contrast thereto, the condition of specific cells is reversed in the second preferred embodiment shown in FIG. 6. More specifically, the bar state and the cross state of the switch cells SC in the odd-numbered rows, the first column and in the odd-numbered rows, the n-th column correspond to the off state and the on state, respectively, and the bar state and the cross state of the other switch cells SC correspond to the on state and the off state, respectively.

With this configuration, the drive conditions for each switch cell SC described with reference to FIG. 5 can be used as they are, thereby obtaining the effect that a compact optical switch can be provided. In addition, it is also possible to obtain an noticeable effect that the crossovers of the optical waveguides can be eliminated to thereby suppress an increase and variations in excess loss. Furthermore, the optical waveguides can be easily arranged in parallel at equal intervals at the input ports and the output ports, thereby obtaining another effect that the optical switch can be easily connected to other optical elements such as optical fiber transmission lines.

FIGS. 7 and 8 are tables showing the numbers of reflections in the optical paths from the inputs to the outputs in the preferred embodiments shown in FIGS. 1 and 6, respectively. In each of FIGS. 7 and 8, the numeral attached to "SW" in each cell indicates the number of reflections in each switch cell SC, and the numeral attached to "FX" in each cell indicates the number of reflections in each fixed mirror or reflection cell RC. Further, the numeral shown on the right-hand side in each cell indicates the total number of reflections in each optical path. In the preferred embodiment shown in FIG. 1, the total number of reflections is classified into three kinds, i.e., 1, 2, and 3 as shown in FIG. 7. In the preferred embodiment shown in FIG. 6, the total number of reflections is classified into three kinds, i.e., 0, 2, and 4 as shown in FIG. 8.

Figure 9:
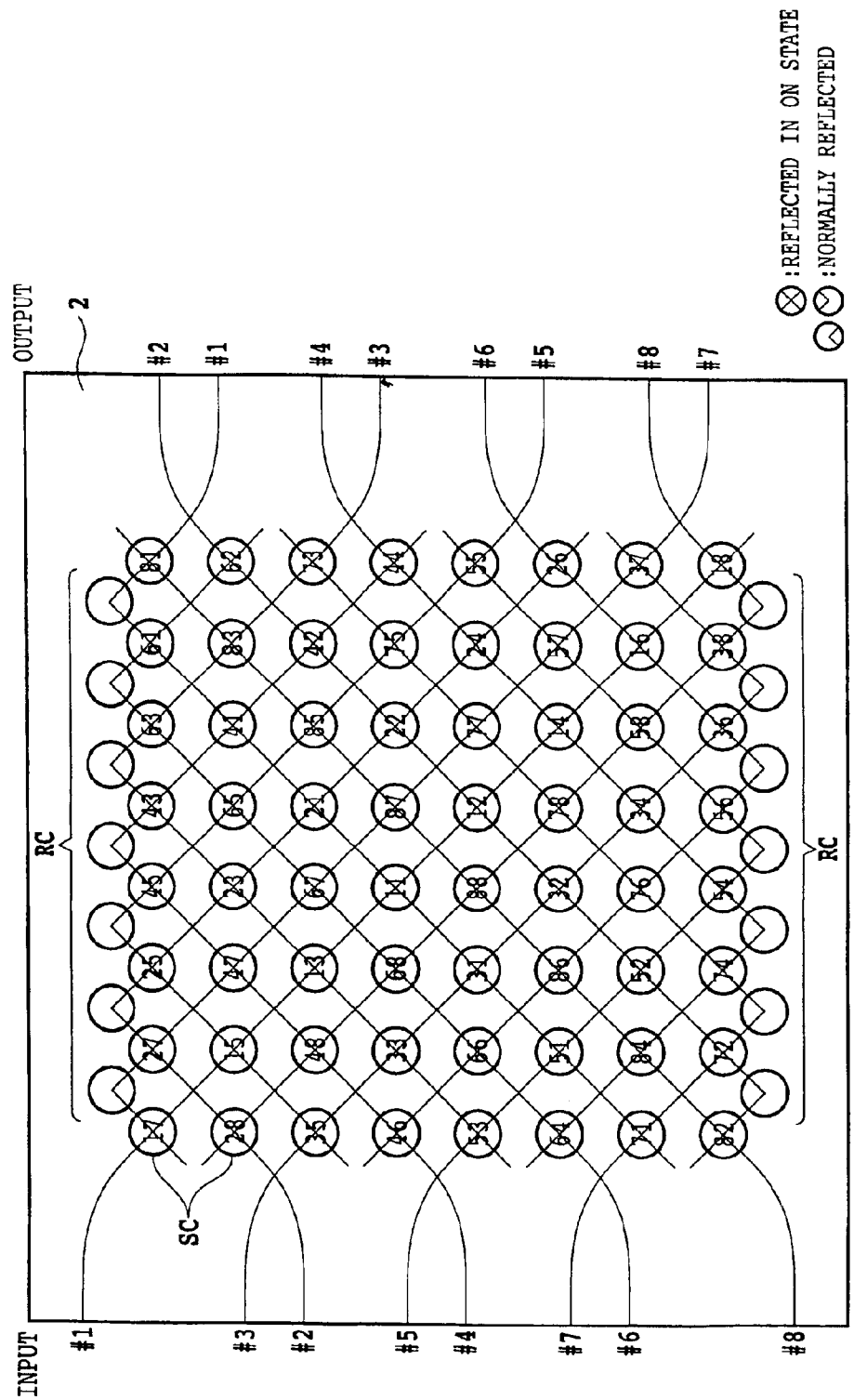
FIG. 9 is a plan view showing a third preferred embodiment of the optical switch according to the present invention.

FIGS. 9 and 10 are plan views showing third and fourth preferred embodiments of the optical switch according to the present invention, respectively. The third preferred embodiment shown in FIG. 9 corresponds to a case where the first preferred embodiment shown in FIG. 1 is expanded to an optical switch with 8 inputs and 8 outputs, and the fourth preferred embodiment shown in FIG. 10 corresponds to a case where the second preferred embodiment shown in FIG. 6 is similarly expanded to an optical switch with 8 inputs and 8 outputs. FIGS. 11 and 12 are tables showing the numbers of reflections in the optical paths from inputs to the outputs in the preferred embodiments shown in FIGS. 9 and 10, respectively.

As apparent from FIGS. 11 and 12, the total number of reflections in the 8×8 optical switch is similar to that in the 4×4 optical switch. More specifically, the total number of reflections in the preferred embodiment shown in FIG. 9 is classified into three kinds, i.e., 1, 2, and 3 as shown in FIG. 11, and the total number of reflections in the preferred embodiment shown in FIG. 10 is classified into three kinds, i.e., 0, 2, and 4 as shown in FIG. 12.

In the case that the reflection loss is unignorable, there is a possibility of production of path-dependent loss due to the reflection loss.

In considering the total number of reflections in the preferred embodiment described with reference to FIGS. 9 and 11, it is understood that the total number of reflections can be fixed to 2 without the dependence on path by using only the even-numbered channels or only the odd-numbered channels. Accordingly, by using the switch cells SC relating to the switch cells SC in the odd-numbered rows, the first column and in the odd-numbered rows, the n-th column or by using the switch cells SC relating to the switch cells SC in the even-numbered rows, the first column and in the even-numbered rows, the n-th column, the total number of reflections can be fixed to 2 without the dependence on path, thereby eliminating the path-dependent loss.

Figure 13:
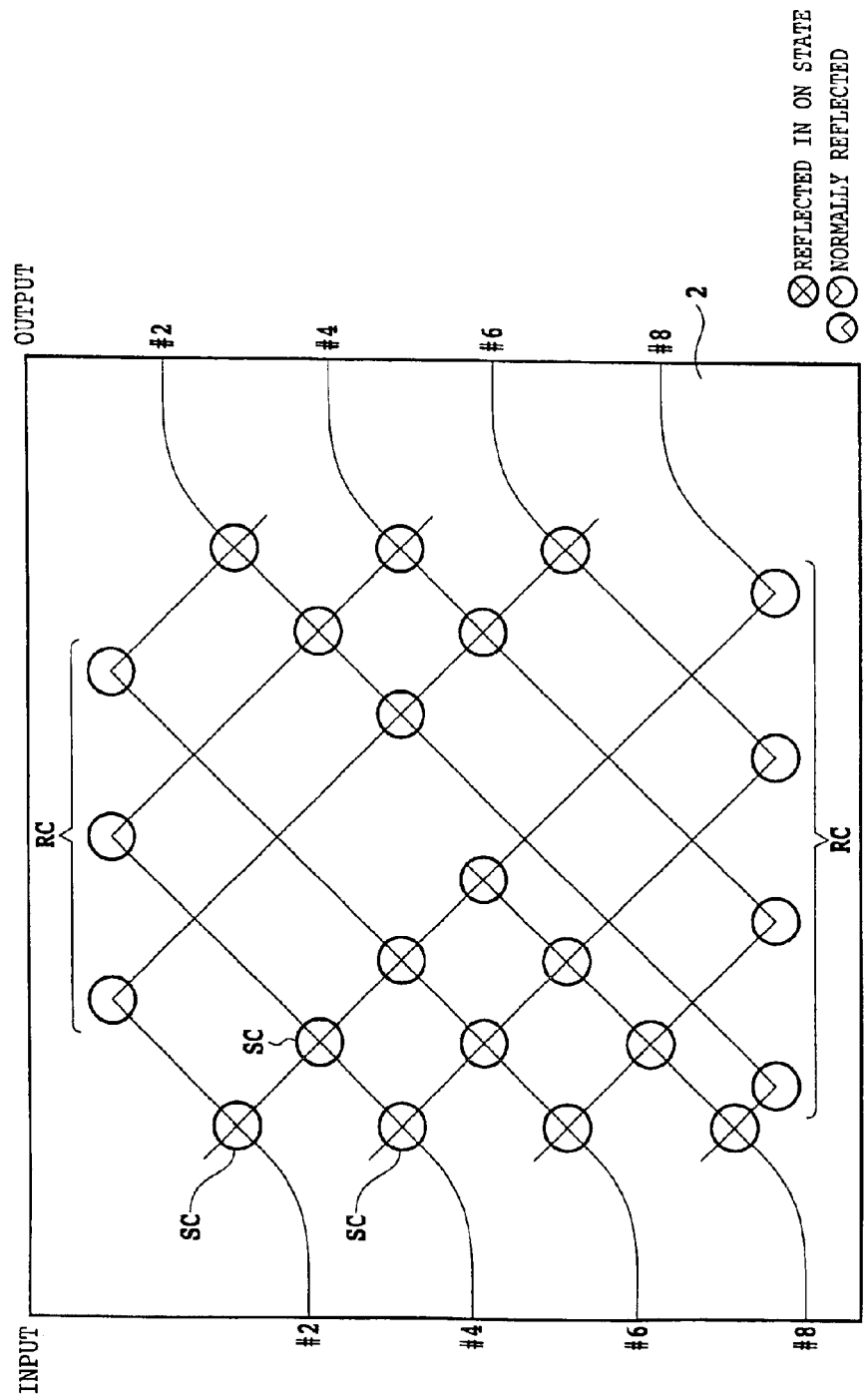
FIG. 13 is a plan view for illustrating a preferred embodiment of the using method for the optical switch according to the present invention.
Figure 14:
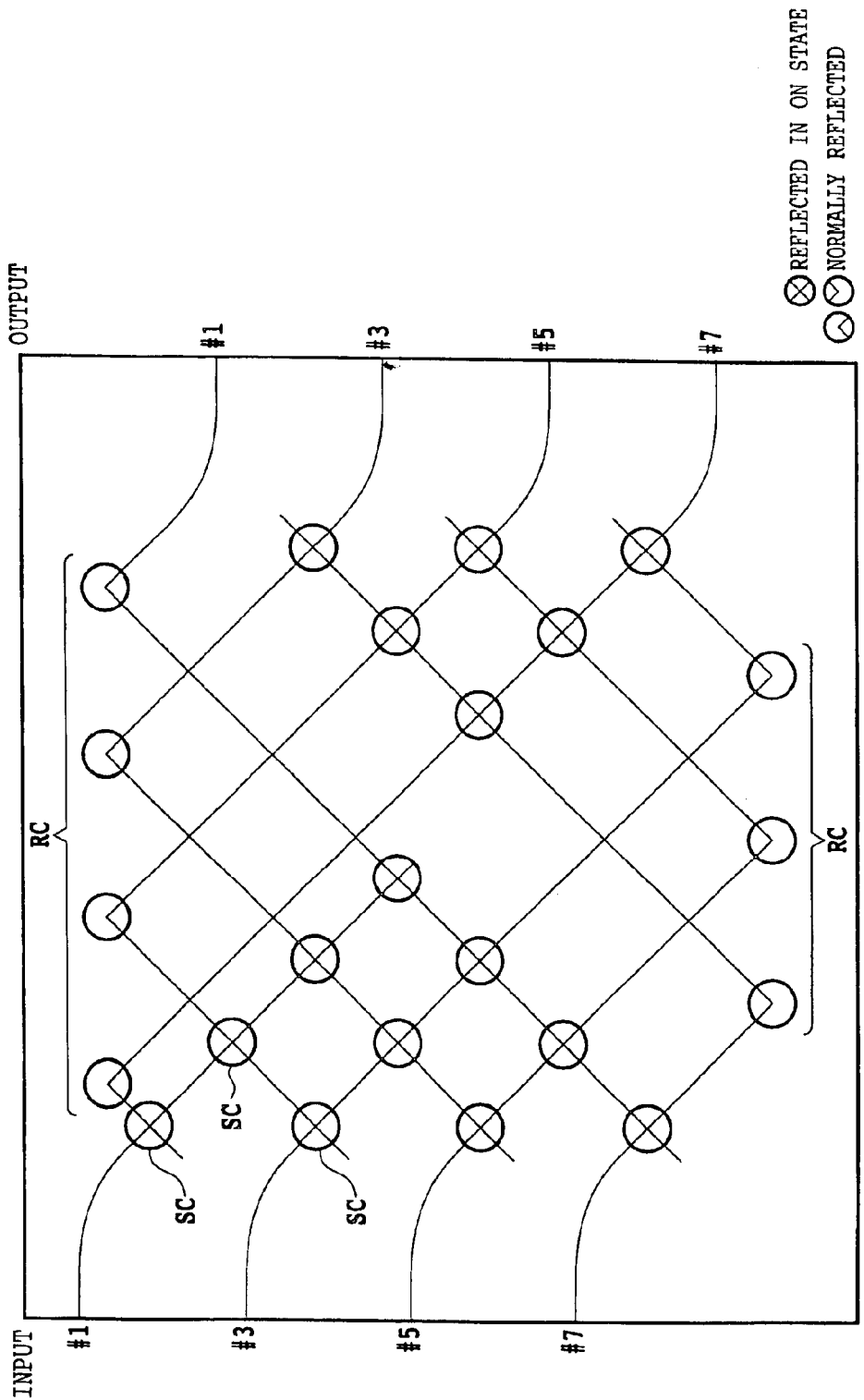
FIG. 14 is a plan view for illustrating another preferred embodiment of the using method for the optical switch according to the present invention.

FIGS. 13 and 14 are plan views for illustrating different using methods for the optical switch according to the preferred embodiment shown in FIG. 9. In the using method shown in FIG. 13, only the switch cells SC relating to the switch cells SC in the even-numbered rows, the first column and in the even-numbered rows, the n-th column are used. In the using method shown in FIG. 14, only the switch cells SC relating to the switch cells SC in the odd-numbered rows, the first column and in the odd-numbered rows, the n-th column are used. Accordingly, the total number of reflections in the optical switch can be fixed to 2 in such a manner that reflection occurs once in one of the switch cells SC and occurs once in one of the reflection cells RC in each optical path, thus eliminating the path-dependent loss. According to the using method for the optical switch according to the present invention, the optical switch which can be reduced in size and can suppress an increase in excess loss can be effectively used with the production of the path-dependent loss being prevented.

While the using method for the optical switch shown in FIG. 9 has been described to demonstrate the prevention of the production of the path-dependent loss, the same effect can be obtained also by manufacturing an optical switch having switch cells SC and reflection cells RC specifically arranged as shown in FIG. 13 or FIG. 14 and using this optical switch.

In the case of using the optical switch shown in FIG. 10 without the production of the path-dependent loss, only the switch cells SC relating to the switch cells SC in the even-numbered rows, the first column and in the even-numbered rows, the n-th column are used.

Figure 15:
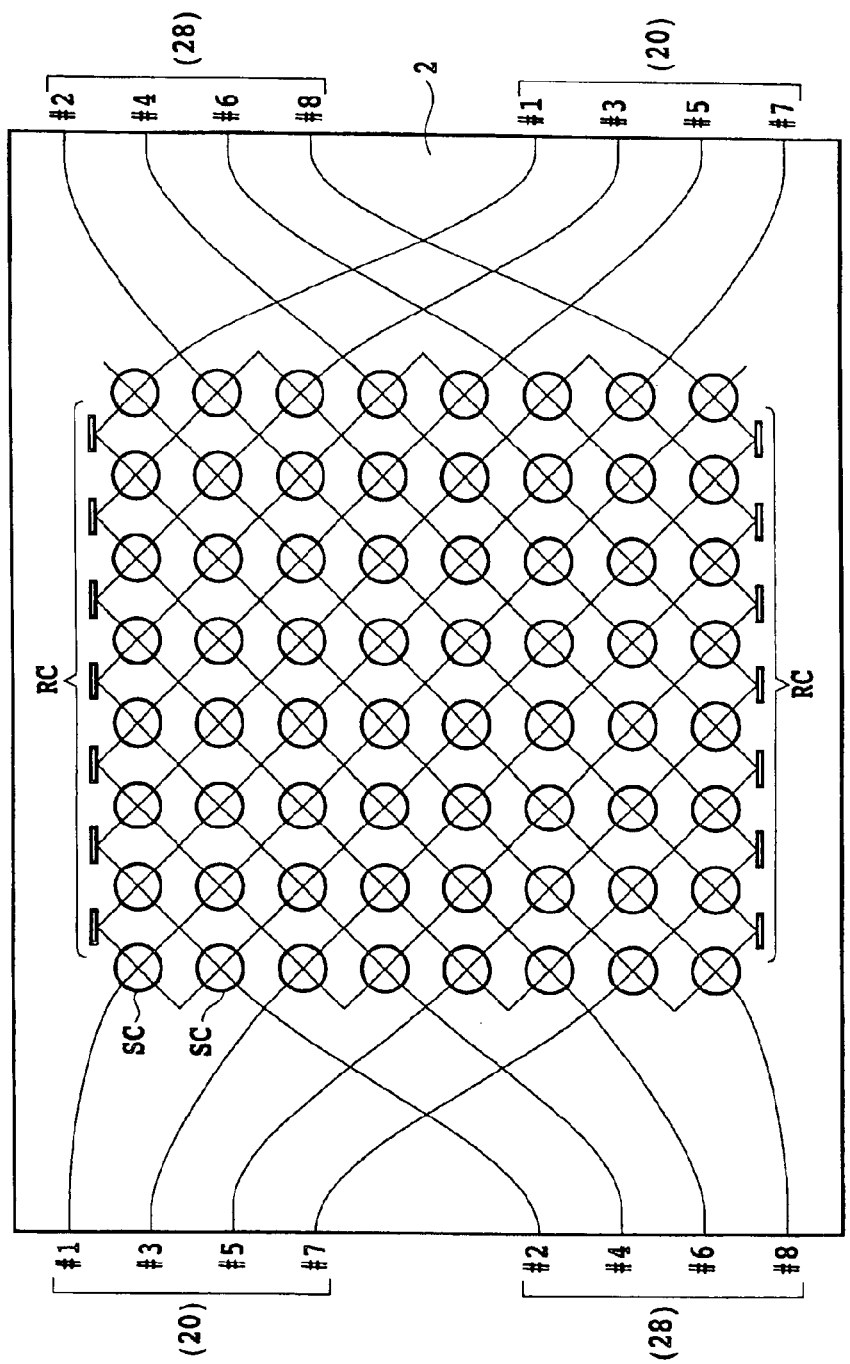
FIG. 15 is a plan view showing a fifth preferred embodiment of the optical switch according to the present invention.

FIG. 15 is a plan view showing a fifth preferred embodiment of the optical switch according to the present invention. In this preferred embodiment, the 8×8 optical switch shown in FIG. 9 is effectively used as two 4×4 optical switches.

Figure 16:
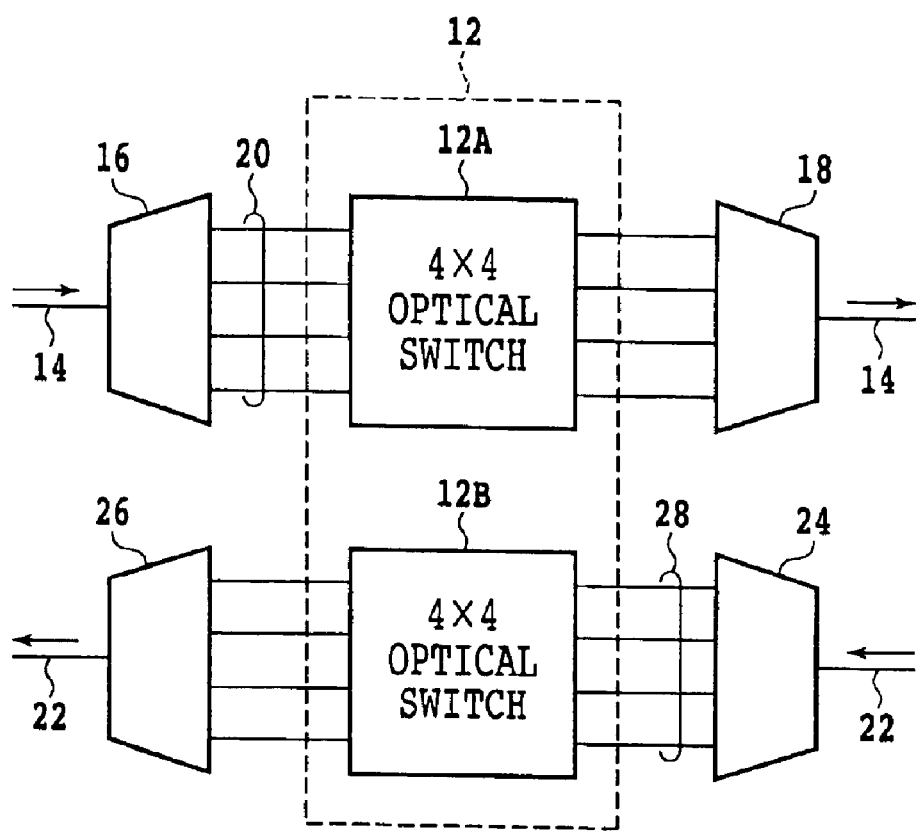
FIG. 16 is a diagram for illustrating an example of use of the optical switch shown in FIG. 15.

FIG. 16 is a block diagram for illustrating an example of use of the optical switch shown in FIG. 15. Reference numeral 12 denotes the optical switch shown in FIG. 15. The optical switch 12 has functions of two 4×4 optical switches 12A and 12B respectively adapted to upstream and downstream optical fiber transmission lines 14 and 22. WDM (wavelength division multiplexing) is applied to each of the optical fiber transmission lines 14 and 22.

The optical fiber transmission line 14 is connected through an optical demultiplexer 16 and an optical multiplexer 18 to an optical fiber transmission line unit 20 consisting of a plurality of optical fiber transmission lines, and processing such as routing in the optical fiber transmission line unit 20 is performed by the 4×4 optical switch 12A. Similarly, the optical fiber transmission line 22 is connected through an optical demultiplexer 24 and an optical multiplexer 26 to an optical fiber transmission line unit 28 consisting of a plurality of optical fiber transmission lines, and processing such as routing in the optical fiber transmission line unit 28 is performed by the 4×4 optical switch 12B.

Referring again to FIG. 15 in connection with FIG. 2, the input ends IN1 of the switch cells SC in the odd-numbered rows, the first column and the output ends OUT2 of the switch cells SC in the odd-numbered rows, the n-th column are inserted in the optical fiber transmission line unit 20. Further, the input ends IN2 of the switch cells SC in the even-numbered rows, the first column and the output ends OUT1 of the switch cells SC in the even-numbered rows, the n-th column are inserted in the optical fiber transmission line unit 28.

Accordingly, the optical switch 12 operates as shown in FIG. 14 for the optical fiber transmission line unit 20, and operates as shown in FIG. 13 for the optical fiber transmission line unit 28, so that a switching operation such as routing can be efficiently performed without the production of the path-dependent loss. Furthermore, efficient integration of the switch cells SC can be effected and size reduction can also be effected by the use of the reflection cells RC, thereby providing a large-scale and compact optical switch.

There will now be described a configuration capable of eliminating the path-dependent loss in a MEMS type optical switch.

Figure 17:
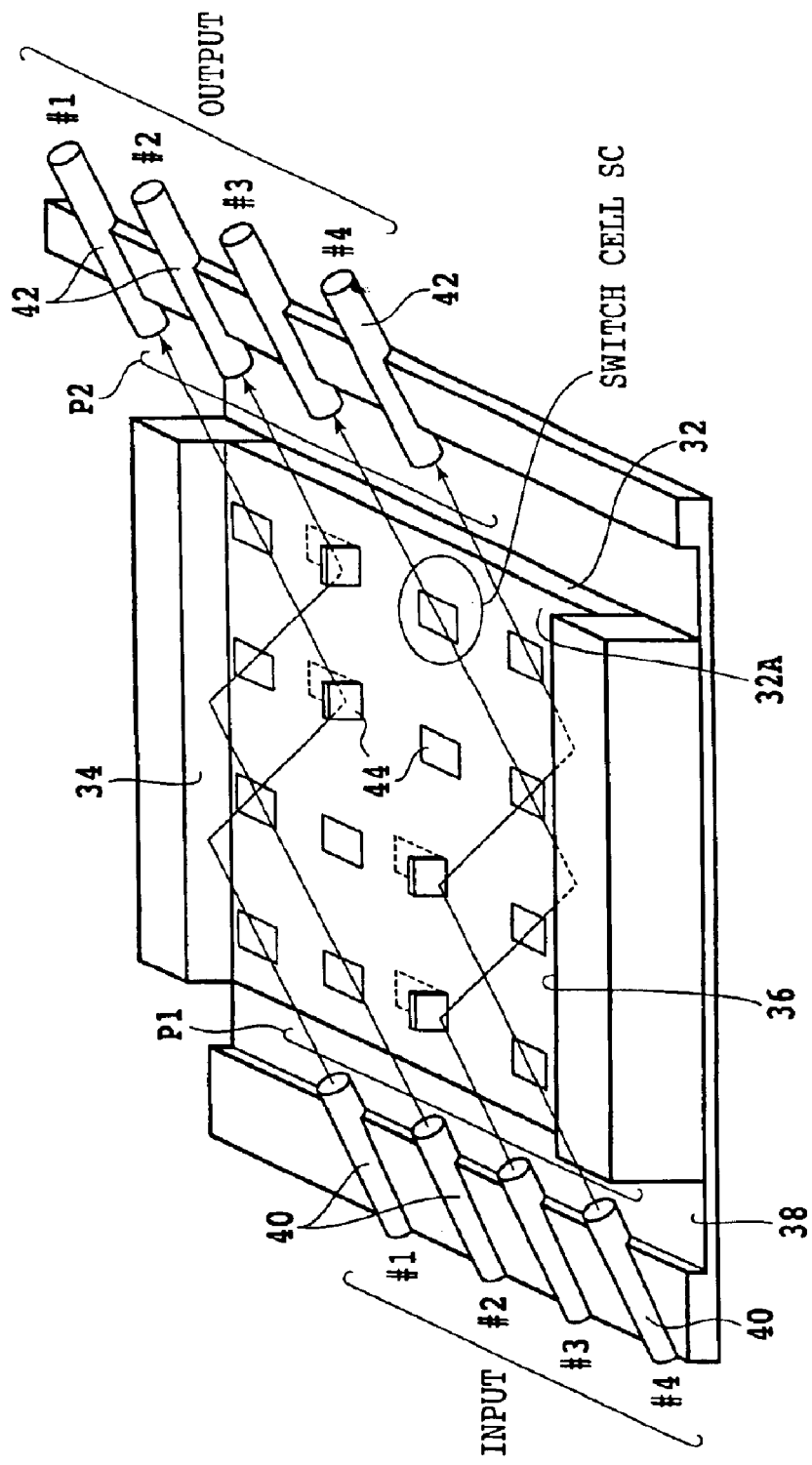
FIG. 17 is a perspective view of a MEMS type optical switch.

FIG. 17 is a perspective view of a MEMS type optical switch. This optical switch includes a substrate 32 integrally having 16 switch cells SC formed by MEMS, mirrors 34 and 36 parallel to each other and perpendicular to a principal surface 32A of the substrate 32, and an optical unit 38 for providing input paths P1 for input channels (input ports) #1 to #4 and output paths P2 for output channels (output ports) #1 to #4.

The optical unit 38 includes optical fibers 40 provided so as to respectively correspond to the input channels #1 to #4 and optical fibers 42 provided so as to respectively correspond to the output channels #1 to #4. Collimating optical systems are formed by lenses (not shown) between the optical fibers 40 and the optical fibers 42. The optical fibers 40 are provided so that the input paths P1 are parallel to each other and inclined relative to the mirrors (reflecting means) 34 and 36. The optical fibers 42 are provided so that the output paths P2 are parallel to each other and inclined relative to the mirrors 34 and 36. In FIG. 17, the optical fibers 40 and 42 are parallel to each other in the same plane.

The switch cells SC are provided on the principal surface 32A of the substrate 32. Each switch cell SC includes a switch mirror 44 movable relative to the substrate 32, and can switch between a first condition where the switch mirror 44 is parallel to the principal surface 32A and a second condition where the switch mirror 44 is perpendicular to the principal surface 32A. In FIG. 17, each switch mirror 44 is parallel to the mirrors 34 and 36 in the second condition.

Each switch mirror 44 is provided by a small mirror formed on the substrate 32 by a semiconductor fabrication technique, and is driven by static electricity to thereby switch optical paths.

Since this optical switch employs mirrors, it is superior in switching performance to a waveguide type optical switch. Moreover, the switch size can be reduced to the same level as that of a waveguide type optical switch.

Figure 18:
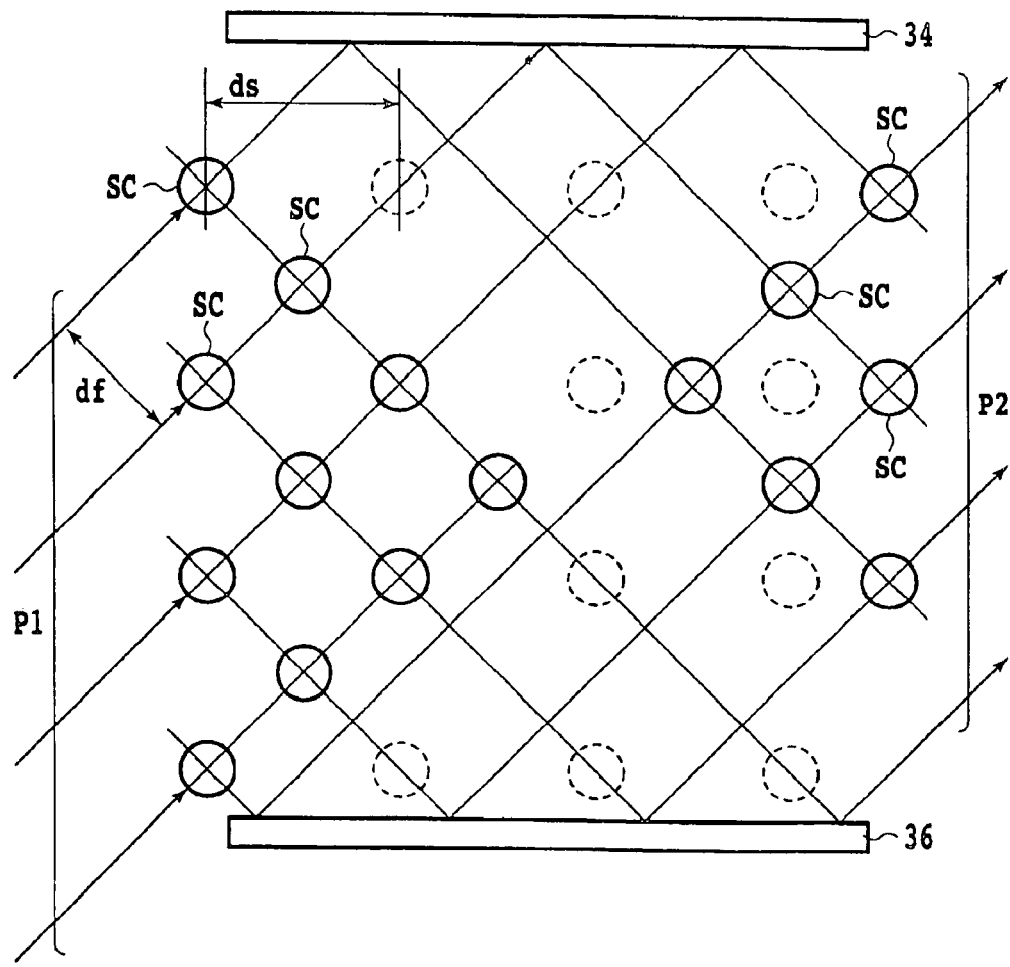
FIG. 18 is a plan view showing a sixth preferred embodiment of the optical switch according to the present invention.

FIG. 18 is a plan view showing a sixth preferred embodiment of the optical switch according to the present invention. In this preferred embodiment, a 4×4 optical switch is provided. Assuming that the pitch of the input paths P1 and the output paths P2 is df, the lattice spacing ds in a 4×4 matrix is given as ds=√2df.

In this preferred embodiment, a matrix having a lattice spacing of ds/2 is assumed, and the positions and number of switch cells SC are set so that the number of reflections in each optical path from the input to the output becomes the same number (2). This will now be described more generally.

Figure 19:
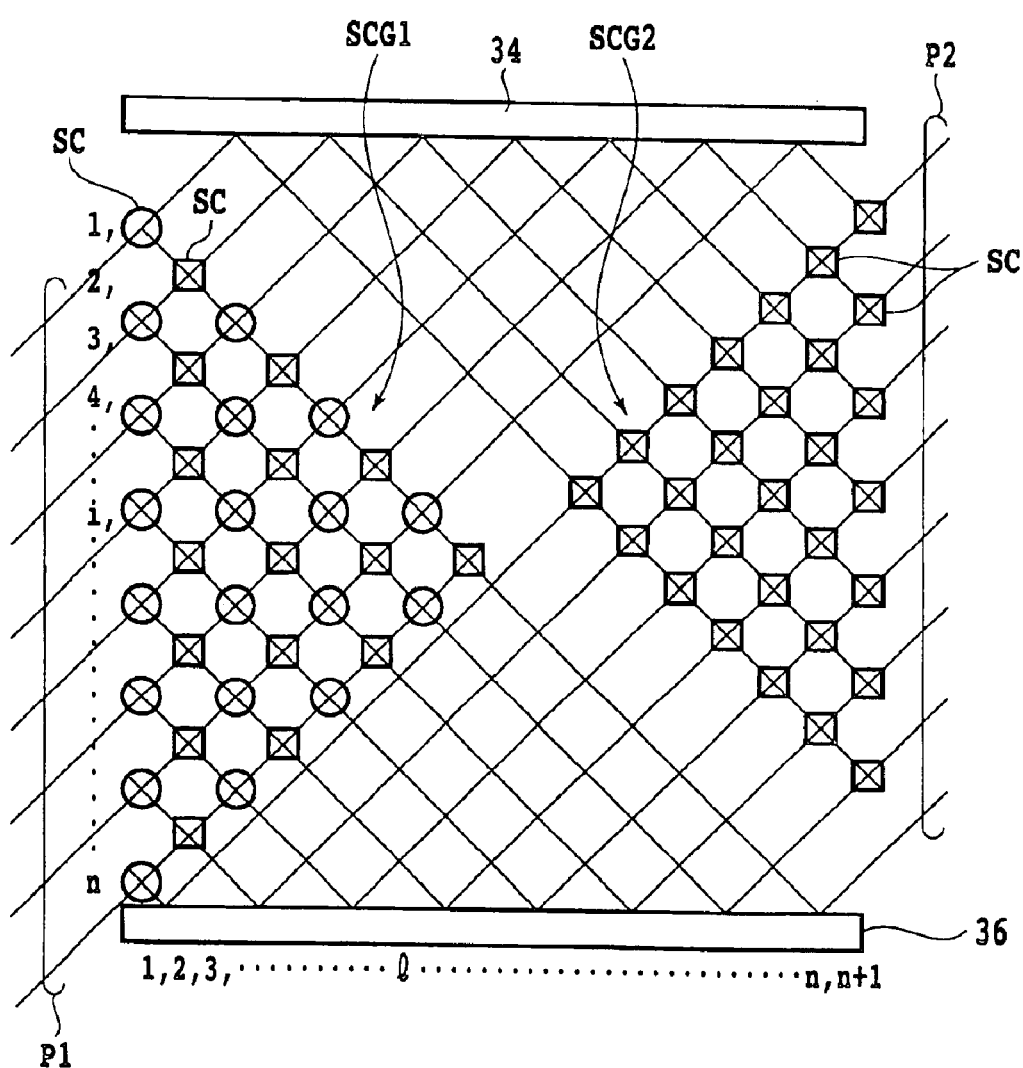
FIG. 19 is a plan view showing a seventh preferred embodiment of the optical switch according to the present invention.

FIG. 19 is a plan view showing a seventh preferred embodiment of the optical switch according to the present invention. In this preferred embodiment, an N×N optical switch (N is an integer) is provided by expanding the 4×4 optical switch shown in FIG. 18 for the purpose of general description.

$N^2$ switch cells SC are arranged at the lattice positions of a matrix with n (n=2N−1) rows and (n+1) columns.

A pair of mirrors 34 and 36 (see FIG. 17) are arranged perpendicularly to a plane defining the above matrix and parallel to each other so as to interpose all the switch cells SC.

The number and positions of the switch cells SC are set so that the input paths P1 corresponding to the N inputs and the output paths P2 corresponding to the N outputs are parallel to each other and that the number of reflections in an optical path connecting each input path P1 and each output path P2 becomes 2. This will now be more specifically.

The $N^2$ switch cells SC include a first switch cell group SCG1 consisting of N(N+1)/2 switch cells SC arranged on the input side and a second switch cell group SCG2 consisting of N(N−1)/2 switch cells SC arranged on the output side.

The first switch cell group SCG1 is arranged so as to occupy all the lattice positions included in a region defined by a triangle whose one side is formed by a line segment including the n lattice points in the first column.

The second switch cell group SCG2 is arranged so as to occupy all the lattice positions included in a region defined by a triangle whose one side is formed by a line segment including the (n−1) lattice points in the (n+1)-th column.

In regarding the matrix with n rows and (n+1) columns as coordinates, the above arrangement of the switch cells SC may be described specifically as follows:

In the first column, at the positions of 1, 3, 5, . . . , and n;

In the second column, at the positions of 2, 4, 6, . . . , and (n−1);

In the third column, at the positions of 3, 5, . . . , and (n−2);

. . .

In the N-th column, at the position of N;

In the (N+2)-th column, at the position of (N−1);

In the (N+3)-th column, at the positions of (N−2) and N;

...

In the (n+1)-th column, at the positions of 1, 3, 5, ..., and (N−2).

According to this preferred embodiment, reflection occurs once in one of the switch cells SC and occurs once on the mirror 34 or 36. That is, the total number of reflections is always 2, so that the path-dependent loss can be eliminated. Further, an increase in switch size can be suppressed by the half pitch, so that size reduction of the optical switch is not hindered. In addition, the optical path length is also constant regardless of path, and this optical switch can be easily connected to other optical devices because the direction of the input paths P1 is the same as that of the output paths P2.

According to the present invention as described above, it is possible to provide an optical switch which can eliminate the path dependence of loss. It is also possible to provide an optical switch which can be reduced in size. Further, it is possible to provide an optical switch which can suppress losses by eliminating crossovers of the optical waveguides.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical switch with N inputs and N outputs (N is an integer), comprising:

a plurality of switch cells arranged at the lattice positions of a matrix with n rows (n=2N−1) and n+1 columns; and two mirrors arranged perpendicularly to a plane defining said matrix and parallel to each other so as to interpose said plurality of switch cells;

the number and positions of said plurality of switch cells being set so that input paths corresponding to said N inputs and output paths corresponding to said N outputs are parallel to each other and that the number of reflections in an optical path connecting each input path and each output path becomes 2.

2. An optical switch according to claim 1, wherein the number of said plurality of switch cells is $N^2$.

3. An optical switch according to claim 1, wherein said plurality of switch cells comprise a first switch cell group consisting of N(N+1)/2 switch cells arranged on the input side and a second switch cell group consisting of N(N−1)/2 switch cells arranged on the output side.

4. An optical switch according to claim 3, wherein:

said first switch cell group is arranged so as to occupy all the lattice positions included in a region defined by a triangle whose one side is formed by a line segment including the n lattice points in the first column; and said second switch cell group is arranged so as to occupy all the lattice positions included in a region defined by a triangle whose one side is formed by a line segment including the (n−1) lattice points in the (n+1)-th column.

5. An optical switch according to claim 1, wherein each of said plurality of switch cells comprises a switch mirror movable relative to said plane.

6. An optical switch according to claim 5, wherein each of said plurality of switch cells switches between a first state where said switch mirror is parallel to said plane and a second state where said switch mirror is perpendicular to said plane.

* * * * *

UNITED STATES PATENT AND TRADEMARK OFFICE
CERTIFICATE OF CORRECTION

PATENT NO. : 6,901,179 B2
DATED : May 31, 2005
INVENTOR(S) : Yoichi Oikawa

It is certified that error appears in the above-identified patent and that said Letters Patent is hereby corrected as shown below:

Column 13,
Line 31, change "n+1)" to -- (n+1) --.

Signed and Sealed this

Twenty-eighth Day of March, 2006

JON W. DUDAS
*Director of the United States Patent and Trademark Office*